Patented Nov. 2, 1937

2,098,190

UNITED STATES PATENT OFFICE 2,098,190

SUBSTITUTED SUCCINIC ACIDS AND ESTERS THEREOF AND USES THEREFOR

Lucas P. Kyrides, Webster Groves, Mo., assignor to Monsanto Chemical Company, St. Louis, Mo., a corporation of Delaware No Drawing. Application April 25, 1935, Serial No. 18,122

6 Claims. (Cl. 106—40)

This invention relates to alkoxy or aryloxy compounds and it has particular relation to alkoxy, aryloxy and hydro-aryloxy succinic acid and to esters thereof.

The main objects of the invention are to provide:

New compounds of the above described class which are suitable for various purposes including uses as plasticizers for nitrocellulose, acetyl cellulose and other cellulosic plastic compositions; as plasticizers of styrol resins, of polymerized vinyl resins such as vinyl chloride or vinyl acetate or mixtures thereof, and modified vinyl ester resins such as may be obtained by condensing a vinyl ester with an aldehyde such as formaldehyde, acetaldehyde and the like, phenol formaldehyde resins, alkyd resins of the type obtained by condensation of glycerol or polyhydroxy alcohol with such dicarboxylic acids as phthalic acid; intermediates for the preparation of artificial resins of the alkyd type; as germicidal and insecticidal compositions; as intermediates for combination with heavy metals such as lead, cobalt, manganese, etc. to form oil soluble paint and lacquer driers and for numerous other applications of this general type.

These and other objects will be apparent from the following description:

It has heretofore been proposed to esterify such dicarboxylic acids as maleic acid with various alcohols to provide compositions possessing the characteristics of plasticizers for cellulose lacquers, artificial resins and the like. The simple dicarboxylic acids, such as maleic acid, have also been suggested as suitable for esterification of polyhydroxy alcohols, such as glycerol, to provide artificial resins or ester products which might be employed as film forming constituents or as modifiers of constituents in lacquers.

The present invention is based upon the discovery that esters and salts of unsaturated dicarboxylic acid, such as maleic or fumaric acid, under suitable conditions may be condensed with hydroxy compounds to form ether compounds which, for many purposes, are equal to or superior to maleic or fumaric acid or their esters. The examples of hydroxy compounds include normal butyl alcohol, amyl alcohols including the primary, secondary and ternary forms, hexyl alcohols, heptyl alcohols, octyl alcohols, dicyclo alcohols and other higher alcohols and their isomeric forms. The condensates of the higher alcohols and maleic acid esters and half esters are of particular interest as intermediates for sulfonation to provide wetting agents. Phenols, such as simple phenol, resorcinol, cresol, tertiary butyl phenol, tertiary amyl phenol, octyl phenol, the hydrogenated derivatives of these various phenols such as cyclohexanol, naphthol, hydrogenated naphthol, benzyl alcohol, likewise react in similar manner with maleic and fumaric acid.

These compounds are termed alkoxy or aryloxy succinic acids or esters and are of the probable structural formula:

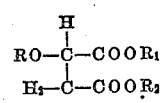

where R comprises hydrocarbon residues of any of the hydroxy compounds above referred to. The groups $R_1$ and $R_2$ may be like or unlike radicals selected from a class comprising hydrogen, alkyl or aryl groups, i. e. residues of methane, ethane, phenol; glycolic acid or its esters, diethylene glycol, or any of the substituents mentioned as forming the group R, or a residue of any other alcohol capable of forming ester groups with the carboxyl groups of maleic acid.

Compounds of this type are conveniently prepared by causing maleic or fumaric acid esters or half ester salts to react or condense with the desired alcohol or phenol in the presence of a relatively small quantity (1/40 mol., more or less, equivalent) of an alkali alcoholate or phenolate.

Di-normal butyl butyloxy succinate was prepared by treating dibutyl maleate (boiling point 156° C. at 18 mm.) with 1 to 3 molar equivalents of anhydrous normal butyl alcohol containing the above indicated quantity of sodium butylate. The solution became relatively warm during the course of the reaction and assumed a cherry red color. The reaction should be conducted under a reflux condenser to which is attached a calcium chloride tube for purposes of preventing the entrance of moisture into the reaction flask. The reaction mixture was shaken frequently and allowed to stand for two or three days. By employing vigorous agitation in the reaction this period of time probably can be reduced materially. The alkoxy esters (di-normal butyl butyloxy succinate) are obtained from the reaction mixture by neutralizing the sodium butylate with dilute hydrochloric acid. As a result of this treatment the ester layer separates and may be washed, dried and distilled. The dibutyl ester of butyloxy succinic acid boils at 168° C. at 6 mm. pressure (absolute) and is a solvent for nitrocellulose. It also dissolves benzyl cellulose when hot. It is miscible with linseed oil, Chinawood oil, soya bean oil, castor oil and petroleum naphtha. It is also strongly resistant in nitrocellulose films to discoloration by light.

In view of the compatibility of this class of compounds with nitrocellulose, they constitute excellent plasticizers therefor. The compatibility with acetyl cellulose, as might be expected, is less than that with nitrocellulose but still, in the case of the phenoxy compounds, it is still quite high. Phenyloxy diethyl succinate may be admixed with acetyl cellulose in a ratio of more than 50% without showing any substantial degree of incompatibility.

The following constitute examples showing the application of the new materials to films containing various cellulosic and resin compositions:

*Example I.*—A nitrocellulose film may be made conveniently by forming a solution of cellulose nitrate in a solvent which may contain the following ratio of ingredients:

25% active solvent such as ethyl acetate, butyl acetate, etc.

20% alcohol such as denatured alcohol, butyl alcohol, etc.

55% hydrocarbon such as benzol, toluol, etc. Thereafter there is added an equal quantity by weight of any of the alkyl or phenyloxy succinic acid esters herein enumerated, for example butyloxy butyl succinate, or the ethyl glycolate ester of an ethyl alkyloxy succinic acid such as the ethyloxy or butyloxy succinic acid. A uniform solution is effected by agitation in the usual manner, after which films may be formed by spreading the mixture over a smooth surface and permitting the low boiling solvents to volatilize. Films so formed are highly resistant to discoloration upon exposure to ultra violet light.

*Example II.*—Cellulose acetate films were made up in a manner analogous to that employed for the preparation of the films of nitrocellulose by substituting acetone as the low boiling solvent for the cellulosic composition. In this case phenyloxy ethyl succinate was employed as the plasticizer.

*Example III.*—A phenol aldehyde condensation product which has been condensed or polymerized insufficiently to render it insoluble in alcohol is dissolved in alcohol, preferably to produce a 50% by weight solution. To 40 grams of such a solution is added 6 grams of the methyl glycolate ester of mono ethyl or butyloxy succinic acid. After mixing thoroughly to obtain a homogeneous solution the alcohol is removed by distillation or evaporation. The resulting product is highly flexible whereas the unplasticized film is very brittle. More or less than 30% of the plasticizer can be employed, depending upon the degree of flexibility desired in the final product. If desired, the final product may be baked or otherwise treated as is well understood by those skilled in the art.

The use of a solvent may be dispensed with in the foregoing example by incorporating the plastioizer into the resin while the latter is in a fluxed or fluid condition.

*Example IV.*—An alkyd resin prepared by condensing phthalic anhydride with glycerol containing a relatively small amount of glycol whereby a soluble thermo-plastic resin is obtained, is mixed while in a molten condition with from five to fifty per cent of any of the foregoing plasticizers, such as dibutyl butyloxy succinate. A uniform mixture is thus obtained which may be employed in the manufacture of varnishes, lacquers or molding compositions in a manner understood by those skilled in the art.

*Example V.*—A polymerized styrol resin is dissolved in a suitable solvent, such as acetone, after which there is incorporated from ten to twenty per cent by weight of the mixed ethyl glycolate ester of mono butyl butyloxy succinic acid.

*Example VI.*—A vinyl resin, such for example as polymerized vinyl acetate, is pulverized, after which from two to twenty per cent of the ethyl glycolate ester of mono ethyl ester of an alkyloxy succinic acid, such as ethyl or butyloxy succinic acid is sprayed on the powder. After standing for a few hours the plasticizer will have penetrated the resin completely and the product may be molded in any desired form in the usual manner.

The plasticizer may also be incorporated into a solution of the vinyl resin if so desired.

The following constitutes a specific example of the preparation of diethyl phenoxy succinate: A mol. (172 gms.) of diethyl maleate prepared in any convenient manner, was incorporated with a thick paste obtained by treating 2.3 grams of sodium (metallic) with 117.5 grams of distilled phenol. The diethyl maleate-phenol mixture became warm and assumed a cherry red color. After standing for ninety hours the mixture was shaken with an excess of 10% sodium hydroxide for purposes of removing phenol. An ester layer separated out and was removed. It was washed with water, then with dilute acid, dried and neutralized with anhydrous sodium carbonate. The crude dried product was purified by distillation under vacuum, followed by refractionation in an ordinary packed column. It exhibited a boiling point of 166° C. at 6 mm. (absolute).

Normal butyloxy succinic acid was obtained from the dibutyl butoxy succinic ester by hydrolysis. The reaction mixture was permitted to reflux for a period of five hours and the alcohol was then distilled off and the alkaline solution made acid. Extraction with two portions of ether, followed by evaporation of the ether gave a viscous liquid which consisted essentially of normal butyloxy succinic acid. It is highly soluble in both ether and chloroform. After the liquid material has been filtered it solidifies giving a product having a melting point of 73° C.–75° C.

Analogous methods may be employed to obtain condensation of any of the phenols or alcohols previously described with maleic or fumaric acid esters or half ester salts to form alkoxy or aryloxy succinic acid esters.

The following materials are specific examples of some of them:

Di-normal-butyl-cyclohexyloxy succinate from di-normal-butyl maleate and cyclohexanol in the presence of a small quantity of the sodium salt of cyclohexanol.

Dicyclohexyl-cyclohexyloxy succinate from dicyclohexyl maleate and the sodium salt of cyclohexanol in cyclohexanol.

The cyclohexyl half ester of cyclohexyloxy succinic acid from the sodium salt of acid cyclohexyl maleate and sodium cyclohexylate.

The half cyclohexyl ester of maleic acid from cyclohexanol and maleic anhydride. The salts (i. e. sodium salt) of this ester may be condensed with the preceding alcohols and phenols to form corresponding alkoxy, aryloxy and hydrogenated aryloxy half esters.

Cyclohexyloxy succinic acid by saponification of the sodium salt of cyclohexyl half ester of cyclohexyloxy succinate, also from the di-ester of cyclohexyloxy succinic acid.

Phenoxy succinic acid by saponification of the phenoxy succinic esters.

The alkoxy or aryloxy succinic acids may, if desired, be esterified with polyhydroxy alcohols such as glycerol or glycol, and these products subjected to resinification in conventional manner to form alkyd type resins which are suitable for use as such or which may be combined with phthalic acid-glycerol ester resins to form modified resins.

By reacting a half ester of an alkoxy, aryloxy or alkyloxy succinic acid with chlorinated aliphatic acid, such as chloracetic, chlorpropionic and esters of these acids, complex esters of the type:

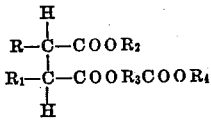

are obtained. In the formula one of the radicals R and $R_1$ is hydrogen while the other is R'O— where $R_1$ is alkyl, aryl, aralkyl or hydrogenated aryl of which the alcohol and phenol residues previously described constitute examples. $R_2$ and $R_4$ may be like or unlike and they may be selected from a broad class including methyl, ethyl, propyl, butyl, amyl, heptyl, phenyl, and hydrogenated aromatic radicals, and $R_3$ methylene. As an example of a compound which is represented by this formula may be mentioned the ester of chloracetic acid and the sodium salt of the cyclohexyl half ester of cyclohexyloxy succinic acid. The methyl, ethyl, etc. esters of chloracetic or other chlor or brom acid may be substituted for chloracetic acid and its homologues. These glycolic acid derivatives and their esters have been found to have outstanding properties as solvents, modifiers and plasticizers in plastic compositions as has already been disclosed in my copending applications Serial Number 618,305 and Serial Number 648,986.

In general, the ether substituted succinic esters in which the ether group is an aliphatic, cycloaliphatic or aromatic group develop characteristic properties in cellulose ester compositions which are not shared by the esters of maleic acid from which the substituted succinates are prepared. These materials are permanently monomeric, they do not undergo resinification or polymerization as is true of the corresponding maleic esters. They are used advantageously for plasticizing various cellulosic and organic plastic materials in the same manner as I have already disclosed in the two applications already referred to hereinabove.

The aryloxy or alkoxy succinic acid or half esters containing free acid groups may be reacted with oxides of cobalt, manganese, lead, etc. to form heavy metal salts of the compounds which, because of the presence and structure of the relatively large organic residues, are highly soluble in various paint and varnish vehicles which include in their composition such drying oils as linseed oil, tung oil, etc. The relatively high solubility of the compounds admits of the introduction into the solution of relatively large quantities of the heavy metals which accelerate drying in the paint vehicle and this favors relatively rapid drying action.

Although I have shown and described only a few of the preferred forms of the invention, it is evident that numerous modifications may be made therein without departure from the spirit of the invention or the scope of the appended claims.

What I claim is:

1. A nitrocellulose composition containing as a plasticizer a material having the formula:

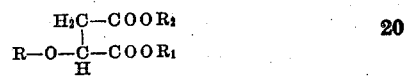

where R is a member of a class consisting of benzene nuclei and aliphatic hydrocarbon chains and $R_1$ and $R_2$ are like or unlike radicals selected from a class consisting of aliphatic hydrocarbon residues, glycol residues and residues of esters of glycolic acid.

2. A plasticized composition of matter comprising a material selected from a class consisting of styrol resins, vinyl resins, alkyd resins, phenol resins, and cellulose esters containing as a plasticizer a material of the formula:

where R is a member of a class consisting of benzene nuclei and aliphatic hydrocarbon chains, and $R_1$ and $R_2$ are like or unlike radicals selected from a class consisting of aliphatic hydrocarbon residues, glycol residues and residues of esters of glycolic acid.

3. A plasticized cellulose ester plastic material containing as a plasticizer a compound of the formula:

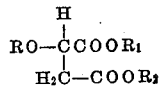

where R is a hydrocarbon radical and $R_1$ and $R_2$ are alkyl groups.

4. A plasticized cellulose ester material containing as a plasticizer a neutral alkyl ester of an acid obtained by addition of a hydroxy substituted hydrocarbon to maleic acid.

5. A composition as defined in claim 3 in which the plastic material is a cellulose acetate.

6. A plasticized composition of matter comprising a material selected from a class consisting of styrol resins, vinyl resins, alkyd resins, phenol resins, and cellulose esters containing as a plasticizer dibutyl butyloxy succinate.

LUCAS P. KYRIDES.

CERTIFICATE OF CORRECTION.

Patent No. 2,098,190. November 2, 1937.

LUCAS P. KYRIDES.

It is hereby certified that error appears in the printed specification of the above numbered patent requiring correction as follows: Page 3, first column, line 25, for "$R_1$" after the word "where" read R'; and that the said Letters Patent should be read with this correction therein that the same may conform to the record of the case in the Patent Office.

Signed and sealed this 25th day of January, A. D. 1938.

(Seal)

Henry Van Arsdale,
Acting Commissioner of Patents.